United States Patent [19]

Haab

[11] Patent Number: 4,813,833

[45] Date of Patent: * Mar. 21, 1989

[54] THREADED FASTENER HAVING JACKETED HEAD

[75] Inventor: Alvin D. Haab, Milford, Ind.

[73] Assignee: Brock Manufacturing, Inc., Milford, Ind.

[ * ] Notice: The portion of the term of this patent subsequent to Nov. 13, 2001 has been disclaimed.

[21] Appl. No.: 529,370

[22] Filed: Sep. 6, 1983

[51] Int. Cl.4 ............................................. F16B 39/282
[52] U.S. Cl. ..................................... 411/188; 411/184; 411/377; 411/903
[58] Field of Search ............... 411/187, 188, 184, 176, 411/371, 373, 377, 160, 161, 162, 163, 164, 165, 369, 396, 542, 531, 903, 902

[56] References Cited

U.S. PATENT DOCUMENTS

| Re. 27,085 | 3/1971 | Weidner ............................ 411/371 |
|---|---|---|
| 186,066 | 1/1877 | Swingly . |
| 442,642 | 12/1890 | Roby . |
| 516,382 | 3/1894 | Russell et al. . |
| 529,970 | 11/1894 | Smouse . |
| 922,191 | 5/1909 | Reynolds . |
| 957,931 | 5/1910 | Bond . |
| 997,118 | 7/1911 | Eden . |
| 1,211,553 | 1/1917 | Dervoz . |
| 1,409,813 | 3/1922 | Anderson . |
| 1,692,469 | 11/1928 | Rex . |
| 1,715,975 | 6/1929 | Angell . |
| 1,719,136 | 7/1929 | Rosenberg . |
| 1,867,354 | 7/1932 | Dickson . |
| 2,074,773 | 3/1937 | Camp et al. . |
| 2,074,774 | 3/1937 | Camp et al. . |
| 2,111,796 | 3/1938 | Meader . |
| 2,400,318 | 5/1946 | Rosan . |
| 2,527,053 | 10/1950 | Bedford, Jr. . |
| 2,634,934 | 4/1953 | Martin et al. . |
| 3,218,656 | 11/1965 | Reiland . |
| 3,218,905 | 11/1965 | Reiland . |
| 3,245,449 | 4/1966 | Mitchell . |
| 3,482,481 | 12/1969 | Newell et al. . |
| 3,500,712 | 3/1970 | Wagner ............................ 411/371 |
| 3,530,760 | 9/1970 | Lindstrand . |
| 3,557,654 | 1/1971 | Weidner, Jr. . |
| 3,592,100 | 7/1971 | Mackiewicz .................. 411/903 X |
| 3,606,357 | 9/1971 | Yonkers ....................... 411/371 X |
| 3,648,560 | 3/1972 | Roser . |
| 3,712,357 | 1/1973 | Corbett et al. . |
| 3,799,229 | 3/1974 | Johnson . |
| 3,854,372 | 12/1974 | Gutshall . |
| 3,903,784 | 9/1975 | Dekker . |
| 3,965,793 | 6/1976 | Roser . |
| 4,104,446 | 8/1978 | Johnson . |
| 4,129,060 | 12/1978 | Gould . |
| 4,231,281 | 11/1980 | Reinwall, Jr. . |
| 4,235,147 | 11/1980 | Weidner, Jr. . |
| 4,316,690 | 2/1982 | Voller . |
| 4,482,278 | 11/1984 | Dorn ................................. 411/377 |

FOREIGN PATENT DOCUMENTS 2398913 3/1979 France ............................. 411/373

OTHER PUBLICATIONS

Brock Bins: *Brock Grain Bins*, published Mar. 1981, especially p. 4.

Primary Examiner—Gary L. Smith
Assistant Examiner—Curtis B. Brueske

[57] ABSTRACT

A metal threaded fastener is disclosed for use in outdoor or other environments where fastener rust or corrosion are to be discouraged. The fastener includes a metal head adapted for engagement with a torque wrench or the like. The head is covered by a polypropylene jacket. Raised metal protuberances below from a bottom clamping surface of the head. In one embodiment, these protuberances extend at least partly through the polypropylene jacket, but the thin covering layer of polypropylene is displaced from the protuberances during bolt installation. These protuberances provide metal-to-metal contact with a workpiece, and consequently encourage maintenance of a correct axial clamping pressure without over-torquing the mating nut.

8 Claims, 1 Drawing Sheet

U.S. Patent  Mar. 21, 1989  4,813,833
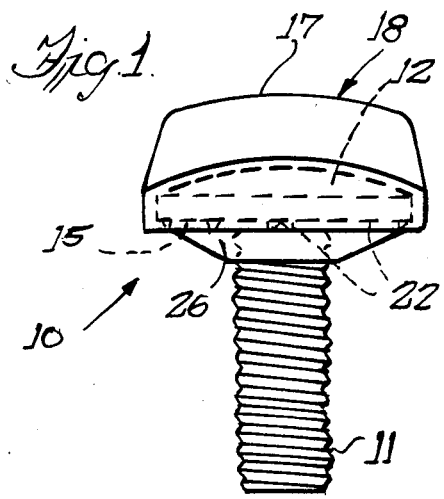
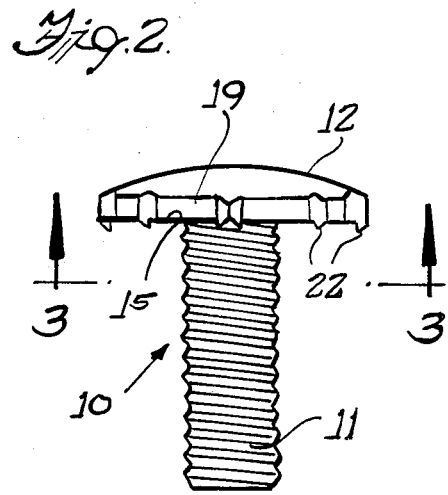
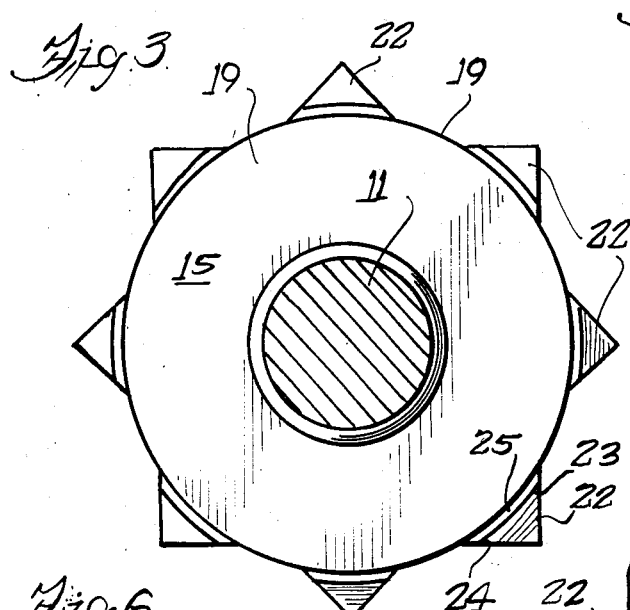
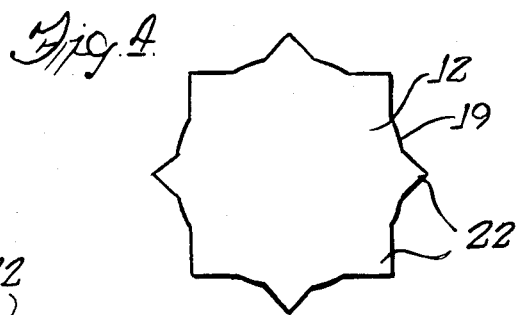
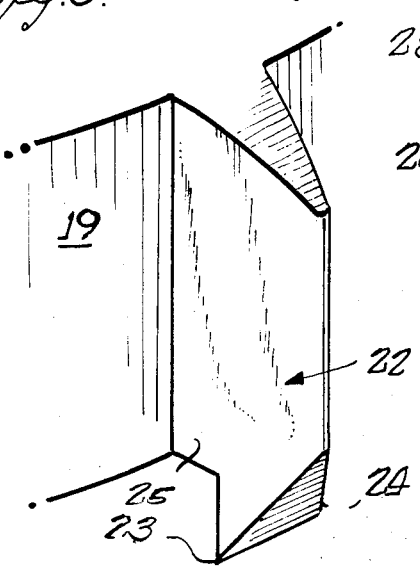
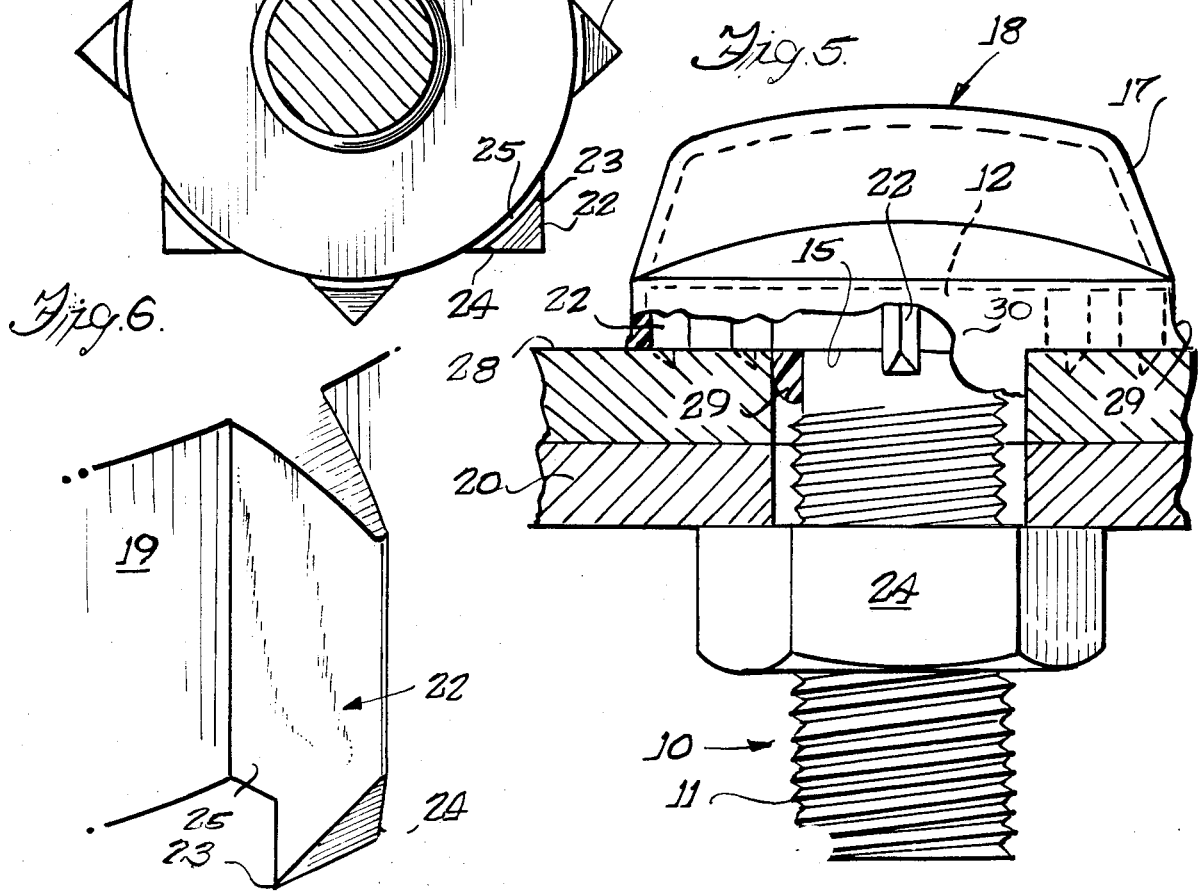

THREADED FASTENER HAVING JACKETED HEAD

BACKGROUND OF THE INVENTION

This invention relates generally to fasteners, and more particularly concerns a threaded metal fastener which can be used in an outdoor environment, and which will provide a long service life without rusting or corroding.

Large, outdoor storage bins are ubiquitous in modern agriculture and industry. They have proved to be highly useful for storing large amounts of grains and foods to be consumed by poultry and other livestock. These bins are often assembled from curved panels which are bolted together. Bolts also secure the bin panels and other parts to legs and other support structure.

In many of these outdoor environments, the bolts can rust, and their stressed attachment to metal panels can cause accelerated rust and deterioration of the panels as well. Accordingly, it has been found helpful to provide bolts having heads which are entirely coated or jacketed in some way. To provide the desired protection from the environment, this molded jacket or coating covers not only over the upper surfaces of the head, but also extends under the bottom head clamping surface The jacket serves to protect the bolt head from rusting, and will also seal the workpiece aperture around the shank of the bolt When assembling the bolts in the bin or other metal workpieces, the usual practice has been to hold the bolt head against rotation while tightening a nut on the bolt shank with an impact wrench. When installing standard, unjacketed, bare metal bolts, the impact wrench operator can hear a somewhat distinctive sound when the nut has been fully torqued or tightened into engagement with the bolt and workpiece. It is believed that this sound is at least partly provided by the metal contact between the bolt head clamping surface and the workpiece. However, completely jacketed bolt heads are insulated from the workpiece, and so there is no metal-to-metal contact, and no such distinctive sound is produced as the nut reaches its final position on the bolt shank. Consequently, the impact wrench operator cannot hear when full tightness has been obtained. Occasionally, then, bin assemblers over-tighten the bolts. This can result in extruding of plastic material out from beneath the bolt head bottom clamping surface. That extrusion may break the plastic sealing effect, and result in loss of corrosion resistance.

In addition, the plastic jacket layer located between the bottom bolt head clamping surface and the workpiece acts as a lubricant, which makes it much easier for the bolt head to turn relative to the workpiece. It is thus necessary to torque the nut upon the bolt shank with a greater than usual force, in order to obtain the desired amount of axial clamping pressure from the bolt.

Accordingly, it is the general object of the present invention to provide a metal fastener, such as a bolt, with a head having a plastic cover, but which can be attached to a workpiece with a head-metal-to-workpiece-metal contact.

It is another object to provide a bolt which co-operates with a torque wrench, nut and workpiece to provide a discernable sound when the bolt and nut have been properly torqued on the workpiece.

Another object is to provide a bolt having a completely jacketed head, which is so arranged that the plastic jacket is prevented from extruding from between the bolt head clamping surface and a workpiece when the bolt is attached to the workpiece.

Yet another object is to provide a bolt having a jacketed head which will withstand an installing torquing force of pre-designed magnitude during bolt installation or attachment to a workpiece.

Other objects and advantages of the invention will become apparent upon reading the following detailed description and upon reference to the drawings. Throughout the drawings, like reference numerals refer to like parts.

BRIEF DESCRIPTION OF THE DRAWINGS

FIG. 1 is an elevational view of the novel bolt;

FIG. 2 is an elevational view of the novel bolt, but showing only the unjacketed or metal portions of the bolt;

FIG. 3 is a sectional view taken substantially in the plane of line 3—3 in FIG. 2 and showing the underside or bottom clamping surface of the bolt head;

FIG 4 is a top plan view of the novel bolt head showing only the unjacketed or metal portions;

FIG. 5 is an elevational view in partial section showing the novel bolt as it appears when fastened by a nut in a workpiece, and FIG. 6 is a fragmentary perspective view showing a portion of the bolt head and an associated workpiece-engaging tooth.

DETAILED DESCRIPTION

While the invention will be described in connection with a preferred embodiment, it will be understood that it is not intended to limit the invention to this embodiment. On the contrary, it is intended to cover all alternatives, modifications and equivalents as may be included within the spirit and scope of the invention as defined by the appended claims.

Turning more particularly to the drawings, there is shown a threaded fastener or bolt 10 embodying the present invention. This bolt 10 includes a threaded metal shank 11 depending from a metal head 12.

The bottom of the head 12 is defined by a bottom clamping surface 15. To discourage rust and other corrosion from attacking the bolt head 12, a jacket 17 covers all the surfaces of the bolt head 12, including the bottom clamping surface 15. This jacket 17 can be molded or otherwise formed of a resilient yet tough polypropylene resin or other suitable material. To permit the bolt 10 to be properly engaged by an installing device such as a torque wrench, the head jacket is provided with a raised portion 18 of non-circular configuration adapted to mate with the wrench.

As explained above, it is an object of the invention to provide metal-to-metal contact between the bolt head 12 and a workpiece 20, and to provide a discernable sound when the bolt head is fully torqued into position. To this end, raised metal protuberances or teeth 22 are formed on the metal head 12 so as to extend down below the bottom clamping surface 15, as shown in FIG. 6. Here, the illustrated teeth 22 are oriented to extend normally or perpendicularly from the bottom clamping surface 15 at least partly through the polypropylene jacket 17, and are located at the outer edge 19 of the head 12. These protuberances 22 are designed to engage the workpiece 20 with metal-to-metal contact, as indicated in FIG. 5. This metal-to-metal contact provides the desired good gripping engagement between the bolt 10 and the workpiece 20, and when a nut 24 is threaded on the bolt shank 11 and tightened into engagement with the workpiece 20, the discernable sound indicating proper torquing is produced. In addition, the nut 24 and bolt 10 need not be stressed to a relatively high degree to achieve the desired axial clamping force To encourage this desired good metal-to-metal gripping action, the metal protuberances 22 here take the form of discrete teeth having generally triangular cross-sections, which are spaced about the periphery of the edge 19 of the clamping surface 15 and head 12, as particularly indicated in FIGS. 3 and 6. The shape or form of the teeth 22 is such that they terminate at twin bottom points 23 and 24, as shown especially in FIG. 6. The points 23 and 24 are located outside the head periphery 19, because the teeth 22 have roots 25 which extend radially from the head periphery 19.

It will be noted that the polypropylene jacket 17 covers the entire fastener head 12, and includes a bottom layer portion 26 which covers the teeth 22. This arrangement discourages rust or corrosion from forming even on the teeth extremities 23 and 24 during bolt storage and before bolt use. That is, the protuberances 22 extend only part way through the polypropylene jacket 17 and bottom layer 26 of the jacket prior to bolt installation in the workpiece 20. Since the polypropylene jacket bottom layer portion 26 is thin, the material between the protuberances 22 and the workpiece surface 28 (FIG. 5) is displaced as the bolt 10 is drawn or turned into engagement with the workpiece 20, and the desired metal-to-metal engagement of the fastener 10 with the workpiece 20 is provided During this displacing action, some material 29 can be forced into the workpiece hole adjacent the shank 11, as shown in FIG. 5. This small material build-up can act as a supplimental corrosion-resisting barrier During assembly, movement of the bolt head 12 toward the workpiece 20 is halted before the polypropylene layer or coating 30 located below the head surface 15 is extruded out from between that head clamping surface 15 and the workpiece surface 28 In this way, polypropylene continuously covers the otherwise-exposed surfaces of the bolt head 12 to provide corrosion resistance and weather or environmental sealing action.

A slightly modified form (not shown) of the invention could be provided. In that embodiment, the raised metal protuberances 22 extend entirely thrugh the polypropylene jacket 17 even before the bolt 12 is installed. No covering bottom layer 26 of polypropylene is provided. Accordingly, no material displacement action is required when the bolt 10 is installed as illustrated in FIG. 5.

The invention is claimed as follows:

1. A fastener, comprising, in combination, a metal shank, a metal head adapted for engagement with an installing device, the head being at least partly defined by a bottom clamping surface, a jacket of polypropylene or similar material covering at least the bottom clamping surface of the head, and raised metal protuberance means affixed to the head at the bottom clamping surface and extending axially therefrom at least partly through the jacket prior to connection of the fastener with a workpiece; wherein said raised metal protuberance means includes a plurality of individual, separate and discrete protuberances spaced about the periphery of the fastener head and terminating axially in workpiece-engaging teeth; said teeth being adapted to extend, when the fastener properly engages a metal workpiece, completely through the jacket so as to provide a metal-to-metal engagement with the workpiece.

2. A fastener according to claim 1 wherein said teeth extend completely through said polypropylene jacket and engage a workpiece surface with metal-to-metal contact after the fastener is torqued.

3. A fastener according to claim 1 wherein said jacket covers the entire fastener head.

4. A fastener according to claim 1 wherein said teeth extend only part way through said polypropylene jacket prior to fastener installation in the workpiece, and wherein said polypropylene jacket is thinner over said teeth than over remaining portions of the bolt head bottom clamping surface.

5. A fastener according to claim 1 wherein said raised metal protuberance means extend entirely through the jacket.

6. A fastener according to claim 1 wherein said raised metal protuberance means extend only part way through said polypropylene jacket prior to fastener engagement with the workpiece.

7. A fastener according to claim 1 wherein said raised metal protuberance means takes the form of a circular array of teeth extending from the fastener metal head.

8. A fastener according to claim 1 wherein said raised metal protuberance means takes the form of a plurality of teeth extending axially below the bottom clamping surface.

* * * * *

UNITED STATES PATENT AND TRADEMARK OFFICE
CERTIFICATE OF CORRECTION

PATENT NO. : 4,813,833

DATED : March 21, 1989

INVENTOR(S) : Alvin D. Haab

It is certified that error appears in the above-identified patent and that said Letters Patent is hereby corrected as shown below:

Column 1, Line 28 from "surface The"

to -- surface. The --

Column 1, Line 30 from "of the bolt"

to -- of the bolt. --

Column 3, Line 8 "clamping force"

to -- clamping force. --

Column 3, Line 34 "is provided During"

to -- is provided. During --

Column 3, Line 43 from "surface 28 In"

to -- surface 28. In --

UNITED STATES PATENT AND TRADEMARK OFFICE
CERTIFICATE OF CORRECTION

PATENT NO. : 4,813,833

DATED : March 21, 1989

INVENTOR(S) : Alvin D. Haab

It is certified that error appears in the above-identified patent and that said Letters Patent is hereby corrected as shown below:

Column 3, Line 50 from "entirely thrugh" to -- entirely through --

Signed and Sealed this

Twelfth Day of June, 1990

*Attest:*

HARRY F. MANBECK, JR.

*Attesting Officer*  *Commissioner of Patents and Trademarks*